United States Patent
Kristjansson

(10) Patent No.: US 10,811,893 B2
(45) Date of Patent: Oct. 20, 2020

(54) PARALLEL CHARGING AND DISCHARGING OF BATTERIES WITH DISPARATE CHARACTERISTICS

(71) Applicant: Microsoft Technology Licensing, LLC, Redmond, WA (US)

(72) Inventor: Stefan Jon Kristjansson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 15/867,028

(22) Filed: Jan. 10, 2018

(65) Prior Publication Data
US 2019/0214837 A1    Jul. 11, 2019

(51) Int. Cl.
H02J 7/00       (2006.01)
H01M 10/44   (2006.01)
H02J 7/04       (2006.01)
H02J 7/34       (2006.01)

(52) U.S. Cl.
CPC ........... *H02J 7/0072* (2013.01); *H01M 10/44* (2013.01); *H02J 7/0013* (2013.01); *H02J 7/0068* (2013.01); *H02J 7/045* (2013.01); *H02J 7/34* (2013.01); *H02J 7/0048* (2020.01); *H02J 2207/10* (2020.01)

(58) Field of Classification Search
CPC .............................. H01M 10/44; H02J 7/0072
USPC .................................................. 320/126, 134
See application file for complete search history.

(56) References Cited

U.S. PATENT DOCUMENTS

| | | |
|---|---|---|
| 3,956,638 A | 5/1976 | Ahrens et al. |
| 6,037,750 A | 3/2000 | Von |
| 6,049,141 A | 4/2000 | Sieminski et al. |
| 6,208,039 B1 | 3/2001 | Mendelsohn et al. |
| 6,462,511 B1 | 10/2002 | Kwok |
| 6,586,909 B1 | 7/2003 | Trepka |
| 6,768,637 B1 | 7/2004 | Amemiya |
| 7,064,521 B2 | 6/2006 | Stanesti et al. |
| 7,136,701 B2 | 11/2006 | Greatbatch et al. |
| 7,414,381 B2 | 8/2008 | Popescu-Stanesti et al. |
| 7,518,338 B2 | 4/2009 | Wang et al. |
| 7,812,579 B2 | 10/2010 | Williams |
| 7,872,443 B2 | 1/2011 | Ward |

(Continued)

FOREIGN PATENT DOCUMENTS

KR            101808449 B1       12/2017

OTHER PUBLICATIONS

"How-To: Parallel Charging", Retreived From <<https://web.archive.org/web/20120108063234/http:/www.tjinguytech.com/charging-how-tos/parallel-charging>>, Jan. 8, 2012, 9 Pages.

(Continued)

*Primary Examiner* — Zixuan Zhou
(74) *Attorney, Agent, or Firm* — Holzer Patel Drennan

(57) ABSTRACT

The herein described technology provides a device with at least two batteries having disparate charge characteristics connected in parallel and sharing a single charging node. The device further includes an adjustable resistance in a charge path between the single charging node and a first battery of the two disparate batteries, and charge control circuitry that dynamically determines a charge rate for the first battery based on a detected battery parameter and controls the adjustable resistance to charge the first battery at the determined charge rate.

20 Claims, 6 Drawing Sheets

(56) References Cited

U.S. PATENT DOCUMENTS

| | | | |
|---|---|---|---|
| 8,120,312 | B2 | 2/2012 | Bucur et al. |
| 8,659,182 | B2 | 2/2014 | Ichikawa et al. |
| 8,674,658 | B2 | 3/2014 | Wang et al. |
| 8,860,372 | B2 | 10/2014 | Guang et al. |
| 9,013,163 | B2 | 4/2015 | Faerber |
| 9,197,076 | B2 | 11/2015 | Butzmann |
| 9,491,314 | B2 | 11/2016 | Wimpenny |
| 9,678,163 | B2 | 6/2017 | McCoy et al. |
| 2005/0212489 | A1* | 9/2005 | Denning ............... H02J 7/0069 320/134 |
| 2006/0066286 | A1* | 3/2006 | Yokota .................. H02H 3/087 320/134 |
| 2007/0247107 | A1* | 10/2007 | Wang .................... H02J 7/0071 320/107 |
| 2011/0100735 | A1 | 5/2011 | Flett |
| 2012/0038320 | A1* | 2/2012 | Kabasawa ............. H02J 7/0019 320/112 |
| 2012/0153899 | A1 | 6/2012 | Marschalkowski et al. |
| 2013/0335028 | A1* | 12/2013 | Choi .................... H02J 7/0026 320/126 |
| 2014/0203780 | A1 | 7/2014 | Hu et al. |
| 2015/0207339 | A1* | 7/2015 | Hamburgen ........ H01M 10/441 320/103 |
| 2015/0270801 | A1 | 9/2015 | Kesler et al. |
| 2017/0054303 | A1 | 2/2017 | Choi et al. |
| 2017/0324256 | A1 | 11/2017 | Mcmorrow et al. |
| 2019/0081487 | A1 | 3/2019 | Baby et al. |
| 2019/0214831 | A1 | 7/2019 | Kristjansson |

OTHER PUBLICATIONS

"Properly Configure Parallel Power Supplies to Share Load Current or Risk System Failure", Retrieved from: https://www.digikey.com/en/articles/techzone/2016/sep/properly-configure-parallel-power-supplies, Sep. 28, 2016, 6 Pages.

"How to Charge Lead Acid Marine and RV Batteries in Parallel", Retrieved From <<https://web.archive.org/web/20170316213447/http:/www.impactbattery.com/blog/tutorials/how-to-charge-marine-and-rv-batteries-in-parallel/>>, Mar. 16, 2017, 4 Pages.

"International Search Report and Written Opinion Issued in PCT Application No. PCT/US18/066342", dated Mar. 11, 2019, 10 Pages.

"International Search Report and Written Opinion Issued In PCT Application No. PCT/US18/066341", dated Mar. 11, 2019, 11 Pages.

Non Final Office Action Issued in U.S. Appl. No. 15/867,279, dated May 31, 2019, 13 Pages.

"Final Office Action Issued in U.S. Appl. No. 15/867,279", dated Nov. 4, 2019, 10 Pages.

"International Search Report and Written Opinion Issued in PCT Application No. PCT/US20/031961", dated Jul. 3, 2020, 13 Pages.

\* cited by examiner

PARALLEL CHARGING AND DISCHARGING OF BATTERIES WITH DISPARATE CHARACTERISTICS

BACKGROUND

Including multiple batteries in an electronic device is one way to extend run-time capacity. If batteries connected in parallel have identical charge characteristics (e.g., total capacity and relative charge state at any given point in time), the batteries may be connected in series (to increase voltage level) or in parallel (to keep same voltage level but increase total capacity) and permitted to charge and discharge at substantially identical rates. If, however, selected batteries have disparate charge characteristics, battery life preservation may depend on regular operation of the batteries at different charge and/or discharge rates. For example, charging a low capacity battery at a higher-than-recommended charge rate can result in severe battery degradation. Charging a high capacity battery at a lower-than-recommended charge rate increases charge time and therefore may limit performance capability during battery discharge.

To address the above charging challenges, some systems isolate batteries with disparate charge characteristics during charging. For example, a high capacity battery and a low capacity battery may be charged sequentially one at a time from a single charger, or charged in parallel with separate chargers. Sequentially charging batteries is time-consuming, and there exists a risk that a sudden power loss may leave different batteries with different states of charge, causing one battery to back-charge into another at an unsafe rate. In contrast to sequential charging, parallel charging with different chargers is costly to implement and may lead to complications in balancing charge when the batteries are reconnected after charging.

In addition to the above-described charging challenges in designing parallel battery circuits, batteries with disparate charge characteristics may naturally discharge at different rates, leading to unequal states of charge. If two electrically-coupled batteries have unequal states of charge at any time (e.g., 20% charged and 70% charged, for example), the battery with the higher state of charge may try to discharge into the other battery in an uncontrolled manner. If this discharge is too high due to battery voltage difference and resistance internal to the packs and between the packs, current protection may be tripped and/or the life of the battery receiving the discharge may be degraded.

SUMMARY

A device disclosed herein includes at least two batteries with disparate charge characteristics that are connected in parallel and arranged to share a single charging node. The device further includes charge control circuitry that controls an adjustable resistance in a charge path between the single charging node and a first battery. The charge control circuitry determines a charge rate for the first battery based on a detected battery parameter and controls the adjustable resistance to charge the first battery at the determined charge rate.

This Summary is provided to introduce an election of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

DETAILED DESCRIPTION

Figure 1:
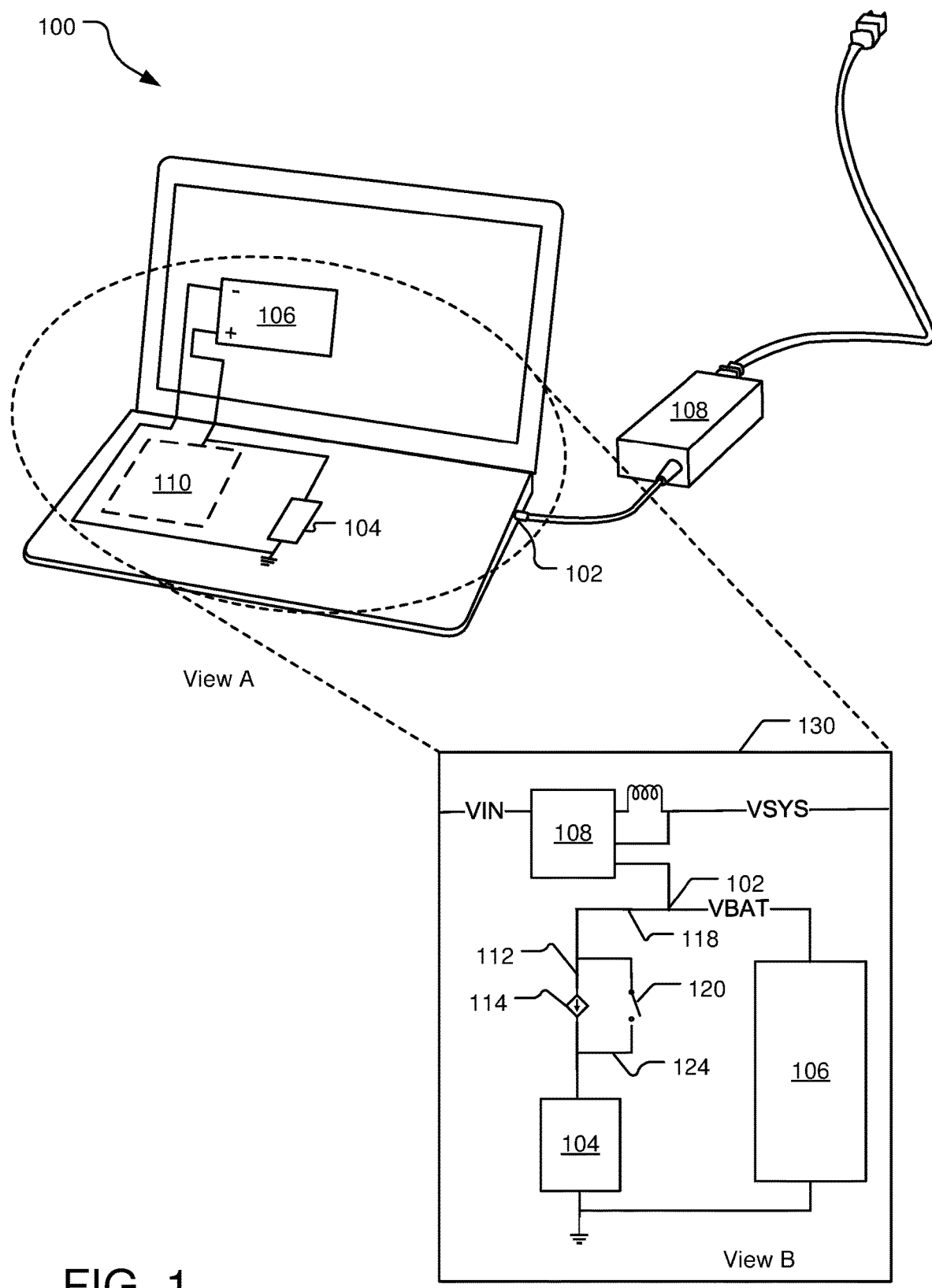
FIG. 1 illustrates an example electronic device for parallel charging and discharging of batteries with disparate charge characteristics.

FIG. 1 illustrates an example electronic device 100 for parallel charging and discharging of batteries with disparate charge characteristics. As used herein, two batteries are referred to as "disparate" or "having disparate charge characteristics" when characterized by charge profiles that are substantially non-identical, such as when the batteries have different capacities, and/or physical characteristics that may lead to different relative states of charge when simultaneously integrated within a same electronic device. For example, two batteries have disparate charge characteristics if they have different capacities, are at different states of charge, and/or are physically located in proximity to loads (and thus impedance) so as to discharge at different rates (thereby leading to different states of charge).

The electronic device 100 is shown to be a laptop computer in FIG. 1, but may, in other implementations, be any battery-powered electronic device. As shown in View A, the electronic device 100 load-drawing system electronics 110 (e.g., a processor, memory, display, speakers, wireless circuitry) is supported by two disparate batteries (a first battery 104 and a second battery 106) arranged in parallel. The two batteries are rechargeable through a single charging node 102 when connected to an external power source, such as to a charger 108 plugged into an outlet or external, portable power supply. In one implementation disclosed herein, the first battery 104 and the second battery 106 are also rechargeable in the sense they may rebalance without a charger attached, if the system loads are light.

In different implementations, the first battery 104 and the second battery 106 may vary in relative charge capacity and positions within the electronic device 100. In one example implementation, the first battery 104 and the second battery 106 are of a same voltage type (e.g., either both single-cell packs (1S), such as 3-4.4V packs, or both dual-cell (2S), such as 6V-8.8V packs). The batteries have separate packs with independent fuel gauges.

In one implementation, the first battery 104 has a smaller capacity than the second battery 106 and the second battery 106 is situated closer to the load-drawing system electronics 110 than the first battery 104. Due to the proximity to the load-drawing system electronics 110, current flowing between the second battery 106 and the load-drawing system electronics 110 is subjected to a greater amount of impedance as compared to current flowing between the first battery 104 and the load-drawing system electronics 110. For this reason, the use of the first battery 104 to assist with load transients can dramatically improve source impedance while also supplying more total capacity during run-time.

View B of FIG. 1 illustrates a parallel battery circuit 130 usable to control current flows between the single charging node 102, the first battery 104, and the second battery 106. The parallel battery circuit 130 is simplified for conceptual illustration and may exclude some components present in actual implementations of the disclosed technology. The parallel battery circuit 130 includes an adjustable constant current limiter 114 (e.g., an adjustable resistance) in the charge path 112 of the first battery 104 downstream of the charger 108. In one implementation, the adjustable constant current limiter 114 limits current along the charge path 112 to charge the first battery 104 at a constant rate corresponding to an active current limit set by charge control electronics (not shown). In some implementations, the charge control electronics of the electronic device 100 adjustably controls the active current limit based on dynamically-detected battery and system parameters, such as charge state or temperature. While the adjustable constant current limiter 114 and the charge control electronics may include a variety of hardware and/or software configurations, some specific, non-limiting examples are discussed further with respect to FIGS. 2-6, below.

In some implementations, the adjustable constant current limiter 114 is controlled by charge control electronics that communicate with electronics coupled to the first battery 104 and/or the second battery 106 to dynamically-assess battery parameters and use such parameters for dynamically adjusting the charge rate of the first battery 104. For example, the first battery 104 and the second battery 106 may each include internal gauges, commonly referred to as fuel gauges or gas gauges, that monitor battery parameters such as voltage, charge state, and temperature and report changes in these battery parameters to a charger. By sampling this information from the first battery 104, the charge control circuitry can dynamically identify a charge rate that is optimal for the first battery 104 at a given point in time and alter setting(s) of the adjustable constant current limiter 114 and/or the charger 108 to ensure that the first battery 104 is provided a constant level of charge at the identified charge rate.

In one implementation, the charge control electronics of the electronic device 100 alters the constant charge rate set by the adjustable current limiter 114 responsive to a detected change in a battery parameter. When, for example, a change is detected in a charge state and/or temperature for the first battery 104, the charge control electronics may identify and select a new charge rate that corresponds to the changed battery parameters, such as by accessing stored battery time-charge profile information. The charge control electronics may then alter a reference setting of the adjustable constant current limiter 114 to begin charging the first battery 104 at the updated charge rate. In one implementation, the charge control circuitry also adjusts a total output setting of the charger 108 when altering the reference setting of the adjustable constant current limiter 114. This ensures that the charge output of the charger 108 remains the sum of a predetermined charge rate for the second battery 106 and the updated charge rate for the first battery 104.

In one implementation, the adjustable constant current limiter 114 toggles between on and off states based on voltage conditions detected within the parallel battery circuit 130. In the "off" state, the adjustable constant current limiter 130 may provide low or near-zero impedance. In the "on" state, the adjustable constant current limiter 114 limits a current flow to the first battery 104 along the charge path 112 based on the currently-selected charge rate. In one implementation, the adjustable constant current limiter 114 is toggled from the "off" state to the "on" state when a voltage detected along a shared battery line 118 satisfies a predetermined threshold. For example, the adjustable constant current limiter 114 remains in the "off" position when a voltage detected along the shared battery line 118 is sufficiently low such that a corresponding influx of charge at the first battery 104 is below the currently-selected charge rate.

In addition to controlling charge to the first battery 104, the parallel battery circuit 130 also includes mechanisms for controlling discharge of the first battery 104. Specifically, the electronic device 100 may include a discharge path 124 controlled by a bypass discharge switch 120. By design, the discharge path 124 provides lower total impedance than the charge path 112, even when the adjustable constant current limiter 114 is not actively contributing impedance to the charge path. Consequently, the first battery 104 discharges along the discharge path 124 whenever the bypass discharge switch 120 is closed, bypassing the adjustable constant current limiter 114 either to support a system load or to back-charge into the second battery 106. Impedance of the discharge path 124 may be selected based on battery characteristics of the first battery 104 and the system requirements, such as to support system transients while still providing a safe discharge rate. In some implementations, the discharge path resistance is tunable to allow selective variation of the discharge rate relative to the other batteries.

Although shown to be a simple switch, the bypass discharge switch 120 may take on a variety of forms that perform the role of switching current flow "on" or "off" along the discharge path 124 based on control parameters managed by discharge control electronics (not shown). The discharge control electronics may, for example, include hardware, software, or a combination of hardware and software components to selectively discharge current responsive to satisfaction of certain system conditions. In one implementation, the discharge control electronics selectively close the bypass discharge switch 120 at times when a measured voltage along the shared battery line 118 is detected below a predetermined threshold (e.g., when the second battery 106 has a low state of charge relative to the first battery 104, or when a system load transient pulls the single charging node 102 temporarily low).

In at least one implementation, conditions that trigger opening/closing of the bypass discharge switch 120 are adjustable to allow selective variation of the discharge rate. Adjustability of the threshold for opening and closing the bypass discharge switch may also be useful to permit swapping of the first battery 104 with another battery having disparate charge characteristics during the lifetime of the electronic device 100. Notably, some implementations of the disclosed technology may not include the discharge path 124. In these implementations, the first battery 104 may be both charged and discharged along the charge path 112.

As described above, the illustrated parallel battery circuit 130 facilitates independent charging of the two batteries at different charge rates. In one implementation, the charger 108 includes a microprocessor that communicates with the control electronics of the first battery 104 and the second battery 106 to dynamically determine battery parameters. The charger 108 selectively meters a total charge supplied at the single charging node 102 to ensure that the second battery 106 is charged at constant selected charge rate corresponding to its current battery parameters (e.g., the charge rate of the second battery 106 is the difference between the total charge supplied and the active current limit currently-implemented by the adjustable constant current limiter 114).

In addition to the above-described advantages, the illustrated parallel battery circuit 130 also facilitates charge balancing between the first battery 104 and the second battery 106 when charging from charger 108 is disabled (e.g., no PSU is attached) and a system power draw is low. Under such conditions, the second battery 106 may discharge current into the first battery 104 along the charge path 112, through the adjustable constant current limiter 114. Likewise, the discharge control electronics may selectively close the bypass discharge switch 120 at times to power a system load with the first battery 104 and/or to allow the first battery 104 to back-charge into the second battery 106.

In the design represented by FIG. 1, it is anticipated that current discharging along the discharge path 124 is, by consequence of the select battery capacities and discharge path resistance, at a rate that is safe for the second battery 106. In systems where there is a risk of discharge from the first battery 104 at a rate that is unsafe for back-charge into the second battery 106, charge limiting circuitry may additionally be included at the input to the second battery 106, as shown and described with respect to FIG. 2, below.

Figure 2:
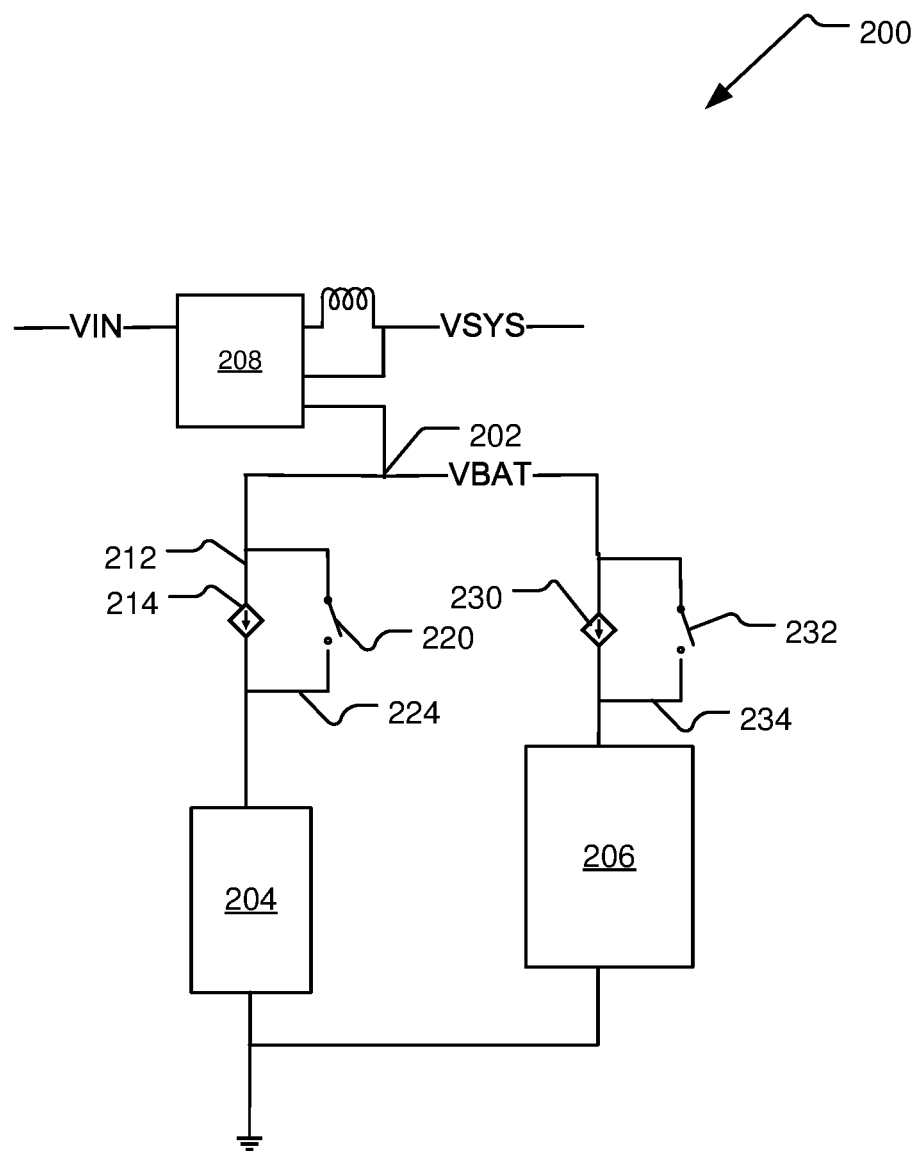
FIG. 2 illustrates another example circuit for parallel charging and discharging batteries with disparate charge characteristics.

FIG. 2 illustrates another example circuit 200 for parallel charging and discharging of a first battery 204 and a second battery 206 with disparate charge characteristics. In one implementation, the first battery 204 and the second battery 206 are of the same voltage level and implement lithium polymer technology. For example, both batteries may have 1S packs, such as 3-4.4 V packs, or both batteries may have 2S packs, such as 6V-8.8V packs. In one implementation, the first battery 204 and the second battery 206 have different capacities. In another implementation, the first battery 204 and the second battery 206 have equal or near equal capacities, but due to load balancing and physical placement, discharge at different rates.

Like FIG. 1, the example circuit 200 includes a single charging node 202 that couples to the power supply unit (PSU) through a charger 208 for simultaneously charging the first battery 204 and the second battery 206. A charge path 212 to the first battery 204 includes an adjustable constant current limiter 214 (e.g., an adjustable resistance) that limits current along the charge path 212 to charge the first battery 204 at a constant rate according to an active current limit set by charge control electronics (not shown). Discharge of the first battery 204 is controlled by a bypass discharge switch 220 that may be selectively closed to shunt current along a discharge path 224 that bypasses the adjustable constant current limiter 214.

In contrast to FIG. 1, the circuit of FIG. 2 additionally includes an adjustable constant current limiter 230 and bypass discharge switch 232 coupled to the second battery 206 at a location downstream of the single charging node 202. The adjustable constant current limiter 230 limits current flow to the second battery 206 based on an active current limit for the second battery 206 that is also set by charge control electronics, such as based on current battery parameters and stored time-charge profile information for the second battery 206. The bypass discharge switch 232 is controlled by discharge control circuitry (not shown) to facilitate selective discharge of the second battery 206 along a discharge path 234 that bypasses the adjustable constant current limiter 230. Other aspects of the adjustable constant current limiter 230 and bypass discharge switch 232 may be the same or similar to those described with respect to the adjustable constant current limiter 214 and the bypass discharge switch 220.

Batteries of even slightly different states of charge, and therefore voltage, may flow charge to equalize their relative charge states when an external power supply is disconnected. The potential for different states to occur is amplified by using batteries of different capacities, batteries located physically far apart, or batteries subjected to different loads. Therefore, the inclusion of an adjustable constant current limiter (214, 230) and bypass discharge control switch (220, 232) at the mouth of each battery, as shown, may be particularly beneficial in systems where there exists a risk that discharge from the first battery 204 may occur at a rate that is unsafe for back-charge into the second battery 206. Due to battery capacity, load balancing, and/or physical placement, there may exist times when the time-charge profile for the second battery 206 requires a charge rate that is lower than a natural rate of discharge from the first battery 204. The likelihood of this type of back-charge is particularly high, for example, when a fresh battery back is installed to replace the first battery 204, and the replacement battery has a charge state that is significantly different than the charge state of the second battery 206 (or vice versa).

With the circuit design disclosed in FIG. 2, the first battery 204 and the second battery 206 safely normalize with one another when either battery is replaced regardless of the relative state of charge of each battery. The adjustable constant current limiter (214, 230) on the input to each battery may also ensure safe levels of back-charge and charge rebalancing when the temperature of the charging battery is outside of a recommended "safe" temperature charging range. For example, charge control electronics may control the adjustable constant current limiter 214 to prevent charging at times when a temperature of the first battery 204 is outside of the safe temperature charging range.

Figure 3:
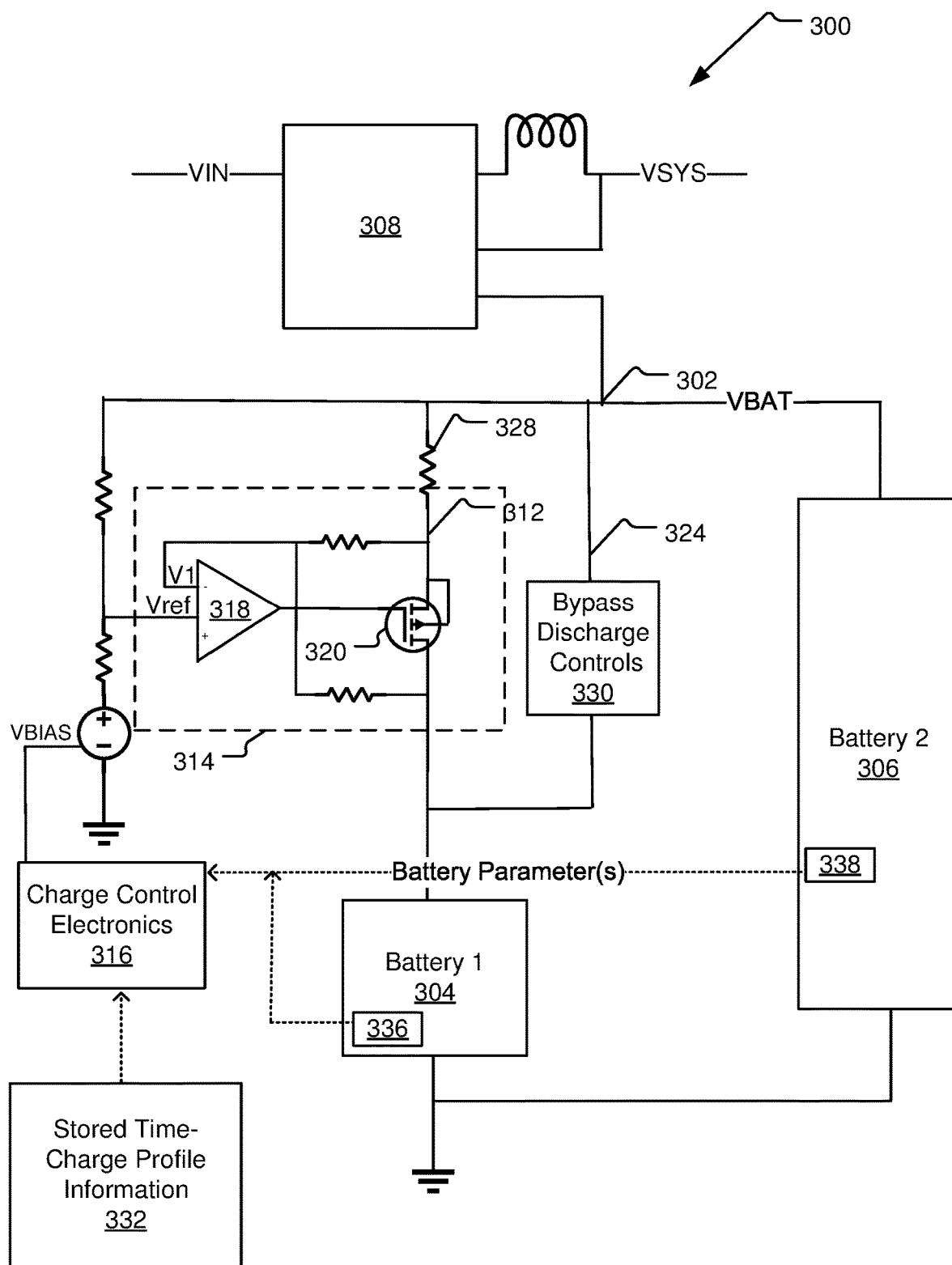
FIG. 3 illustrates yet another example circuit for parallel charging and discharging batteries with disparate charge characteristics

FIG. 3 illustrates an example circuit 300 for parallel charging and discharging of a first battery 304 and a second battery 306 with disparate charge characteristics. The example circuit 300 includes a single charging node 302 that couples to a voltage source through a charger 308 to simultaneously charge the first battery 304 and the second battery 306. The first battery 304 has a smaller capacity than the second battery 306 and the impedance-to-capacity ratio for charging the first battery 304 does not equal to impedance-to-capacity ratio for charging the second battery 306. To prevent charging the smaller battery (e.g., the first battery 304) at an unsafe charge level, an adjustable constant current limiter 314 is included in a charge path 312 of the first battery 304. In the illustrated implementation, the adjustable constant current limiter 314 includes an op-amp 318 controlling a transistor operating in a linear mode by adjusting the voltage applied to drive the gate of a PFET 320 operating in a linear mode. This applied voltage at the gate drive, in turn, controllably varies impedance in the charge path 312 to charge the first battery 304 at a select constant charge rate.

In operation, the op-amp 318 compares a direct measurement of the charge current (e.g., a sense voltage V1) to a setpoint (a reference voltage Vref). The sense voltage (V1) is derived from the voltage drop across a sense resistor 328 carrying the charge current from the charging node 302 to the first battery 304. Because the value of the sense resistor 328 is known, and the reference voltage (Vref) and sense resistor 328 are both referencing the VBAT node 302, any change in the VBAT voltage is rejected by the op-amp 318. When the sense voltage (V1) is less than the reference voltage (Vref), the op-amp 318 increases the gate drive voltage, thereby turning off the PFET 320 incrementally, increasing the resistance in the charge path 312 and thus limiting the charge current to the setpoint per the Vref setting. When the reference voltage (Vref) is less than the sense voltage (V1), the adjustable constant current limiter 314 incrementally reduces its gate drive voltage, thus turning ON the PFET 320 more and more. Therefore, if the current sensed through the sense resistor 328 is below an active current limit of the adjustable constant current limiter 314, the op-amp 318 output is driven low. Here, the adjustable constant current limiter 314 is effectively "off" and the resistance in the charge path 312 consists of the value of the sense resistor 328 and the on-state resistance of the PFET 320.

Charge control electronics 316 control an active current limit for the adjustable constant current limiter 314 by setting the reference voltage (Vref) input to the op-amp 318. In different implementations, the reference voltage (Vref) may be set in different ways, such as with a resistor divider formed with passive resistors, switchable resistors, digipot, a digital-to-analog converter (DAC) or other means of providing a voltage reference.

In one implementation, fuel gauge IC 336 and 338 is included within battery packs of the first battery 304 and the second battery 306, respectively. The fuel gauge IC 336, 338 monitors battery parameters, such as state of charge, current, voltage, and temperature, and reports this information to the charge control electronics 316.

The charge control electronics 316, in turn, analyze the received battery parameters to determine a recommended charge rate for each battery. For example, the charge control electronics 316 may include software and/or firmware executed by an SoC or CPU of a corresponding device. In one implementation, the charge control electronics 316 are included in the charger 308. The charge control electronics 316 process the battery parameters received from the fuel gauge IC 336 and 338 and identify corresponding values within stored time-charge profile information 332 (e.g., pre-programmed table(s)) to determine the target charge rates for each battery 304, 306.

Once the charge control electronics 316 has determined the target charge rates for each battery, the charge control electronics 316 use this information to adjust both output of the charger 308 and to alter the reference voltage (Vref) to the adjustable constant current limiter 314. In this manner, the charge control electronics 316 set the constant current limit for each battery as specified by a pre-programmed table(s).

The charge path 312 includes a sense resistor 328, which causes more current to be drawn from the second battery 306 (the larger battery) than the first battery 304 when supporting a load than a current draw resulting from a direct connection without the sense resistor 328. This may improve load balancing at light loads depending on the capacity vs. impedance ratio of each battery path relative to the load. Additionally, when there are light or no loads on the circuit 300, and if the first battery 304 has discharged more than the second battery 306, the second battery 306 may naturally back-charge the first battery 304 through the adjustable constant current limiter 314 and sense resistor 328 (based on Ohms law) until the current limit is reached.

In one implementation, the resistance of the sense resistor 328 is selected to be large enough to provide a reasonable signal level during low charging levels to the first battery 304), but small enough that additional impedance from the PFET 320 is still utilized to limit current flow to the active current limit when back-charge from battery 306 or charging from the charger 308 at the single charging node 302. This ensures that the adjustable constant current limiter 314 can achieve the desired setting by linearly increasing resistance of the charge path 312 while protecting the first battery 304 even when the PFET 320 is off.

Figure 4:
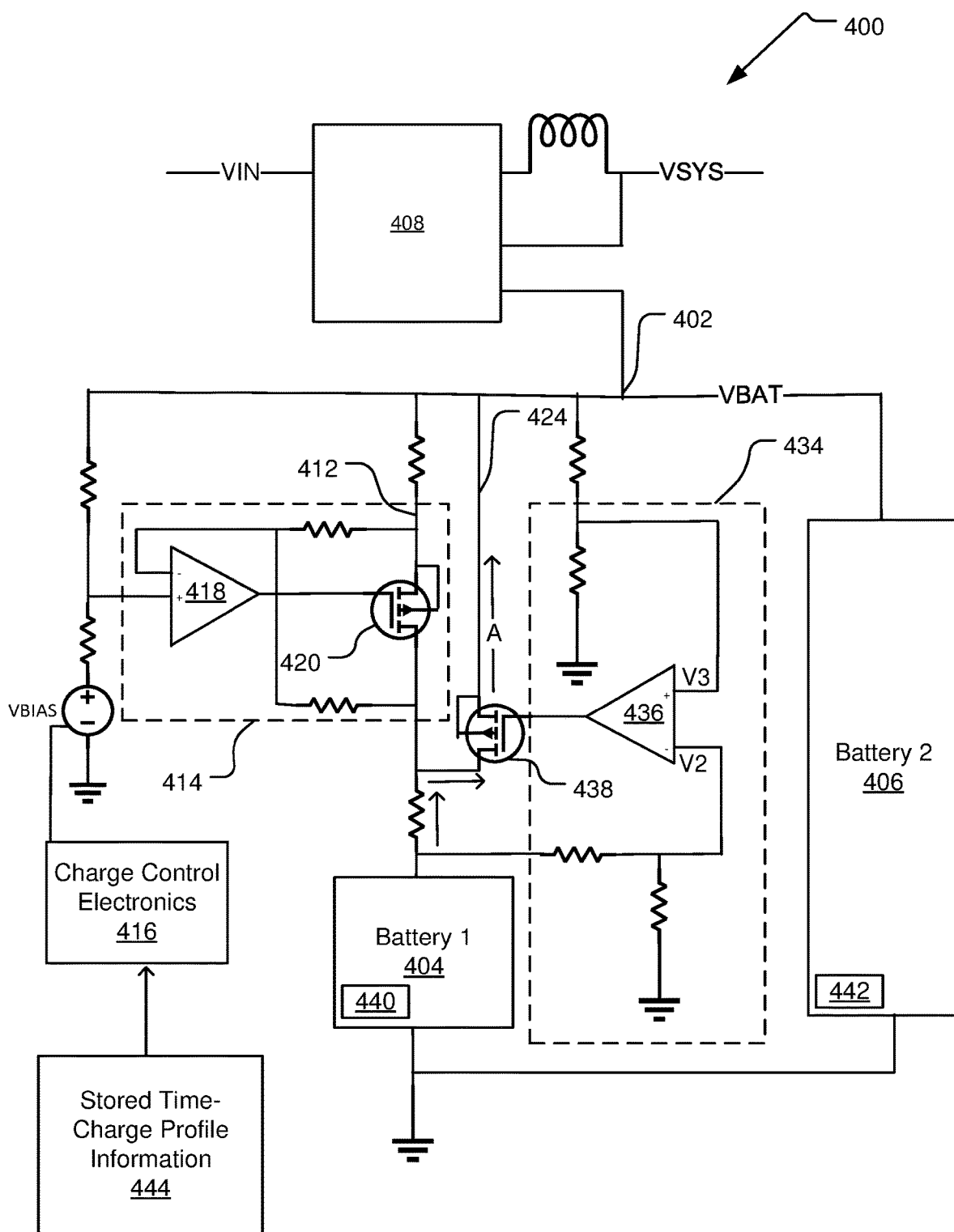
FIG. 4 illustrates still another example circuit for parallel charging and discharging batteries with disparate charge characteristics.

The above-described circuitry for load balancing is particularly advantageous when implemented in electronic devices that rely on continuous simultaneous operation of multiple parallel batteries. For example, a smaller battery may be included near a load source as a way of reducing source impedance to support high load transients. In these devices, depletion of one battery results in a system brown-out, rendering the system unable to operate until re-charged. As the impedance between the larger battery placed further from the loads and smaller battery increases, the effect of the small battery depleting more quickly becomes more pronounced. The above-described back-charging between batteries of different capacities and/or charge states can effectively extend run-time of such a device by allowing a smaller battery (which may otherwise deplete more quickly than a larger battery) to re-charge from and balance with the larger battery during periods of lighter loads In addition to the features described above, the circuit 300 optionally includes a discharge path 324 and bypass discharge controls 330 that selectively enable and disable current flow along the discharge path 324 based on system parameters. If included, the discharge path 324 provides a lower total impedance than the charge path 312, even when the adjustable constant current limiter 314 is not actively contributing impedance to the charge path 312 by decoupling charge sense resistor 328 from the discharge path. Notably, some implementations do not include a discharge path 324. FIG. 4, discussed below, includes example electronics suitable for controlling discharge along the discharge path 324.

In one exemplary implementation, the charge control electronics 316 are implemented within the charger 308 and utilize an I2C protocol to request current battery parameters from the fuel gauge IC 338 within the second battery 306. In response to this request, the fuel gauge IC 338 of the second battery 306 transmits information to the charger 308 indicating a level of charge (e.g., 40% charged) and a current temperature and cycle count. Using this information (such as by consulting one or more look-up tables), the charge control electronics 316 determine that the appropriate charge rate for the second battery is C2. The charge control electronics 316 similarly obtain battery parameters from the fuel gauge IC 336 within the first battery 304 to determine that the active current limit provided by the active current limiter is C1. Responsive to such determination, the charge control electronics 316 alter a total charge to equal the sum of C1, C2, thereby ensuring that the first battery 304 charges at C1 while the second battery 306 charges at C2. In one implementation, the fuel gauge IC 336, 338 additionally provides the charge control electronics 316 with the actual values of current flowing into each battery (304 and 306), and the charge control electronics 316 adjust C1, C2, as necessary, to account for any errors. Further operations performed by charge control electronics are described in detail with respect to FIG. 5, below.

FIG. 4 illustrates an example circuit 400 for parallel charging and discharging of a first battery 404 and a second battery 406 with a greater capacity than the first battery 404. The example circuit 400 includes a single charging node 402 that couples to voltage source through a charger 408 when simultaneously charging the first battery 404 and the second battery 406.

To ensure that the first battery 404 (e.g., the smaller battery) is charged at a safe rate, the example circuit 400 includes an adjustable constant current limiter 414 in a charge path 412. Although the adjustable constant current limiter 414 may take on other forms in other implementations, the adjustable constant current limiter 414 is shown to include an op-amp 418 operating in a closed loop to adjust voltage applied to a gate drive of a PFT 420 operating in the linear mode. This applied voltage at the gate drive controllably varies impedance in the charge path 412 to charge the first battery 404 at a constant charge rate that is selected (and dynamically alterable) by charge control electronics 416, which may include hardware, software, or a combination of hardware and software. In one implementation, the charge control electronics 416 include firmware that is executed by the charger 408. In other implementations, the charge control electronics 416 include firmware executed by a processor (e.g., SoC or CPU) external to the charger 408.

Each of the first battery 404 and the second battery 406 include fuel gauge IC 440 and 442, respectively, for monitoring and reporting current battery parameters back to the charge control electronics 416. The charge control electronics 416, in turn, utilize the received battery parameter values in combination with stored time-charge profile information 444 (e.g., stored tables) to periodically adjust charge rates of each of the batteries. For example, the charge control electronics 416 may change the constant charge rate of the first battery 404 by altering a reference voltage (Vref) of the op-amp 418. Other aspects of the adjustable constant current limiter 414 and/or the charge control electronics 416 may be the same or similar to those described above with respect to FIGS. 2-3.

In addition to the features described above, the example circuit 400 includes a discharge path 424 coupled to the first battery 404 and discharge control electronics 434 to controllably alter impedance in the discharge path 424 and thereby selectively discharge the first battery 404. FIG. 4 includes arrows along the discharge path 424 (e.g., an arrow A) to indicate a direction of current flow along the discharge path 424. In FIG. 4, the discharge control electronics 434 are shown to include hardware components (e.g., various resistors and a comparator or op-amp 436). In other implementations, the discharge control electronics 434 may additionally include software components, such as a microprocessor configured to tune resistance values of the discharge control electronics 434 based on detected battery information.

In FIG. 4, the op-amp 436 acts as a differential amplifier (much like a comparator) to continuously monitor and compare a voltage of the first battery 404 (along an input V2) and a voltage of the single charging node 402 (along an input V3). The op-amp 436 supplies an output that adjusts the gate drive of a bypass FET 438. In at least one implementation, the example circuit 400 includes a comparator in place of the op-amp 436. Threshold level of the op-amp 436 are set such that the bypass FET 438 provides a high level of impedance, blocking the flow of current along the discharge path 424, when the input V3 is greater than the input V2. Consequently, the discharge path 424 is not enabled when the second battery 406 has a high level of charge relative to the first battery 404 or when the charger 408 is active. When the voltage at the single charging node 402 (V3) drops below a predetermined threshold (e.g., by some amount below V2), the op-amp 436 enables the bypass FET 438 to reduce its applied impedance to zero or near-zero. This reduction in impedance along the discharge path 424 shunts current around the adjustable constant current limiter 414, thus ensuring an essentially direct connection of the first battery 404 to the shared VBAT node to support the load transient pulling the VBAT node voltage below the voltage of the battery 404.

When the bypass FET 438 is enabled to flow current along the discharge path 424, as described above, the impedance in the discharge path 424 is lower than impedance in the charge path 412. This, in effect, allows the first battery 404 to be selectively discharged along the discharge path 424 when a system load demands support from the first battery 404, which may, for example, occur when the second battery 406 has experienced a voltage drop and can no longer support the load independently, even if under light loads the second battery 406 was at a higher voltage and stage of charge.

By controlling the adjustable constant current limiter 414 to set a low current limit during back-charging, energy losses during back-charge can be reduced at the expense of slower charge balancing between the two batteries. By allowing a higher back-charge current rate (e.g., within the allowable range based on charge profile due to state of charge and temperature), a faster back charge and rebalancing can be achieved at the expense of some lost energy. This tradeoff can be made based on the use case, product or dynamically based on the scenario or parameters and system needs.

Figure 5:
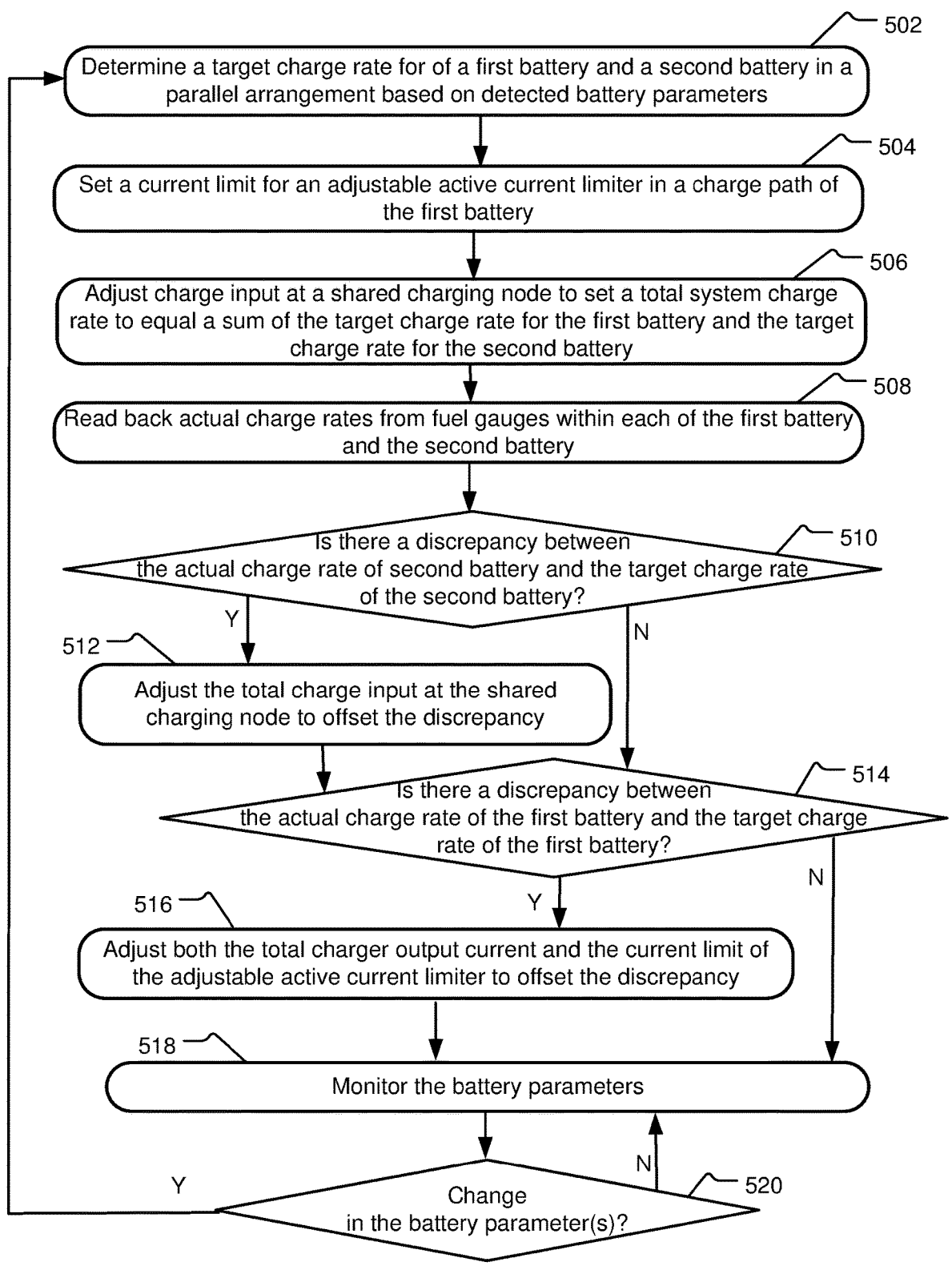
FIG. 5 illustrates example operations for parallel charging and discharging of batteries with disparate charge characteristics.

FIG. 5 illustrates example operations 500 for charging disparate batteries arranged in parallel to draw current from a shared charging node, such as a charging node coupled to a voltage source through one charger or through multiple chargers connected in parallel. In the example operations below, a two-battery system is considered. It may be understood that similar operations could be utilized and/or adapted for systems that included more than two batteries arranged in parallel.

A determination operation 502 determines target charge rates for each of a first battery and a second battery arranged in parallel to draw current from the shared charging node. In one implementation, the determination operation 502 determines the target charge rates for each of the batteries based on an assessment of reported battery parameter values as compared to stored time-charge profile information. For example, fuel gauge IC on each of the batteries may report current battery parameters such as temperature, charge state, and a currently-observed (actual) charge rate. Using this information, the determination operation 502 accesses corresponding values in one or more stored tables, and determines a target charge rate (C1) for the first battery and a different target charge rate (C2) for the second battery.

A current adjustment operation 504 sets a current limit for an adjustable active current limiter that is in the charge path of the first battery. The current is set to enable a charge flow to the first battery at the corresponding determined target charge rate (C1).

Another current adjustment operation 506 adjusts charge input at a shared charging node to set a total charge flow into the system to equal a total charge rate that is the sum of the target charge rate for the first battery and the target charge rate of the second battery (C1+C2).

A battery parameter collection operation 508 reads actual charge rates from the fuel gauges in each battery. A determination operation 510 determines whether there exists a discrepancy between the actual charge rate for the second battery and the target charge rate (C2) for the second battery. If there is a discrepancy, an adjustment operation 512 adjusts the total charge input at the shared charging node to offset the discrepancy (e.g., by increasing the total charge input if the actual charge rate is lower than the target charge rate or by lowering the total charge input if the actual charge rate is higher than the target charge rate).

Another determination operation 514 determines whether there exists a discrepancy between the actual charge rate for the first battery and the target charge rate (C1) for the first battery. If there is a discrepancy, an adjustment operation 516 adjusts both the total charge input at the shared charging node and also the current limit of the adjustable active current limiter to offset the discrepancy. If, for example, the actual charge rate is higher than the target charge rate, both the current limit of the adjustable active current limiter and the total charge input at the shared charging node may be increased by a same amount. If the actual charge rate is lower than the target charge rate, both the current limit and the total charge input may be decreased by a same amount.

A monitoring operation 518 continues monitoring the battery parameters (e.g., based on information collected by the fuel gauges within each of the battery packs), until a detection operation 520 detects a change in one or more of the battery parameters. Responsive to a detected change in the battery parameters, the operations 500 are repeated, as shown.

Figure 6:
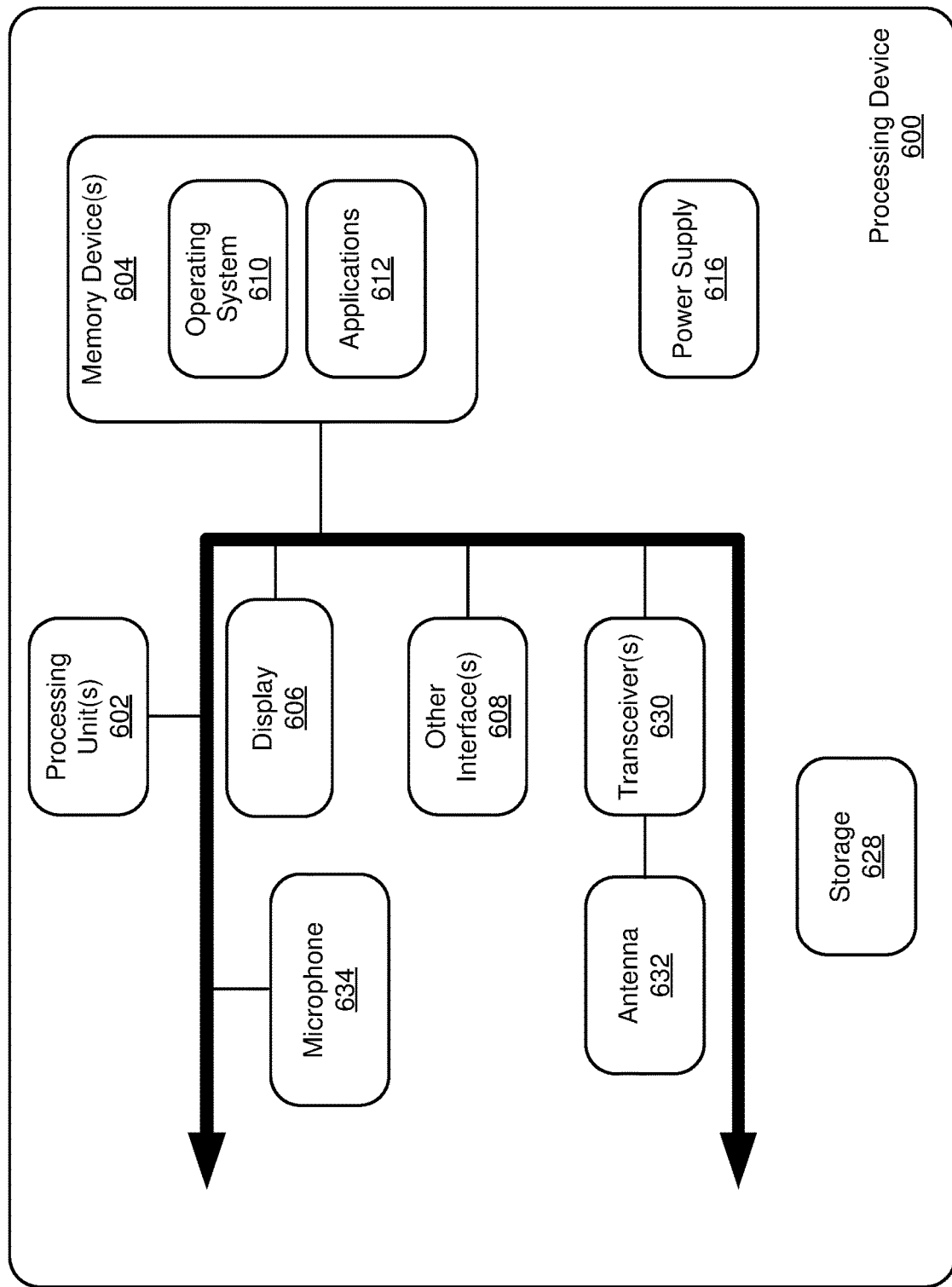
FIG. 6 illustrates an example block diagram of a processing device that may facilitate charge rate selection and/or alteration based on a dynamically-detected battery parameter.

FIG. 6 illustrates an example schematic of a processing device 600 that may implement a parallel battery circuit with disparate batteries according the herein-disclosed technology. The processing device 600 includes one or more processing unit(s) 602, one or more memory devices 604, a display 606, and other interfaces 608 (e.g., buttons). The memory devices 604 generally includes both volatile memory (e.g., RAM) and non-volatile memory (e.g., flash memory). An operating system 610, such as the Microsoft Windows® operating system, the Microsoft Windows® Phone operating system or a specific operating system designed for a gaming device, resides in the memory devices 604 and is executed by the processing unit(s) 602, although other operating systems may be employed.

One or more applications 612, such as applications included within the charge control electronics or discharge control electronics, are loaded in the memory device(s) 604 and executed on the operating system 610 by the processing unit(s) 602. The processing device 600 includes a power supply 616, which is powered by one or more batteries or other power sources and which provides power to other components of the processing device 600. The power supply 616 may also be connected to an external power source that overrides or recharges the built-in batteries or other power sources.

The processing device 600 includes one or more communication transceivers 630 and an antenna 632 to provide network connectivity (e.g., a mobile phone network, Wi-Fi®, BlueTooth®). The processing device 600 may also include various other components, such as a positioning system (e.g., a global positioning satellite transceiver), one or more accelerometers, one or more cameras, an audio interface (e.g., a microphone 634, an audio amplifier and speaker and/or audio jack), and storage devices 628. Other configurations may also be employed. In an example implementation, a mobile operating system, various applications and other modules and services may be embodied by instructions stored in memory device(s) 604 and/or storage devices 628 and processed by the processing unit(s) 602.

The memory device(s) 604 may include memory of host device or of an accessory that couples to a host.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example device disclosed herein includes two batteries with disparate charge characteristics. The two batteries are connected in parallel and share a single charging node. The device further includes an adjustable resistance in a charge path between the single charging node and a first battery of the two batteries, and charge control circuitry that determines a charge rate for the first battery based on a detected battery parameter and controls the adjustable resistance to charge the first battery at the determined charge rate.

In another example device of any preceding device, the charge control circuitry also controls current output of a charger to charge the battery at the determined charge rate.

In still another example device of any preceding device, the charge control circuitry is configured to dynamically alter the charge rate for the first battery responsive to a detected change in the detected battery parameter.

In yet another device of any preceding device, the adjustable resistance includes an op-amp that controls a transistor operating in a linear mode to control impedance in the charge path to charge the first battery at the determined charge rate.

In another example device of any preceding device, the detected battery parameter includes a current state of charge of the first battery.

In still another device of any preceding device further comprises discharge control circuitry that selectively discharges current from the first battery along a discharge path bypassing the adjustable resistance responsive to detection of a voltage drop of the single charging node below a predetermined threshold.

In another device of any preceding device, the discharge control circuitry includes at least one of a comparator and an op-amp to compare a voltage detected for the single charging node to a voltage detected for the first battery.

In yet another device of any preceding device, the first battery is chargeable along the charge path by either an external power supply coupled to the single charging node or by a back-flow of current from a second battery of the two batteries.

An example method disclosed herein includes detecting a battery parameter for at least one of multiple batteries with disparate charge characteristics connected in parallel and configured to share a single charging node in an electronic device. The method further includes determining a charge rate for a first battery of the multiple batteries based on the detected battery parameters; and controlling an adjustable resistance in a charge path between the single charging node and the first battery to charge to the first battery at the determined charge rate.

Another example method of any preceding method further includes detecting a change in the battery parameter; determining a new charge rate for the first battery responsive to the detected change in the battery parameter and controlling the adjustable resistance to provide a constant charge to the first battery at the new charge rate.

In still another example method of any preceding method, the method includes controlling the adjustable resistance further includes setting a reference voltage based on the detected battery parameter and increasing the adjustable resistance to limit current charging the first battery to the determined charge rate responsive to a determination that a voltage along the charge path exceeds the reference voltage.

In another example method of any preceding method, the adjustable resistance includes an op-amp that operates a transistor in a linear mode to control impedance in the charge path to charge the first battery at the determined charge rate.

In still another example method of any preceding method, the method further includes detecting a voltage for a second battery of the multiple batteries and reducing impedance in a discharge path to enable a discharge current flow and support a system load with the first battery responsive to a determination that the detected voltage for the second battery satisfies a threshold.

In still another method of any preceding method, the method further comprises comparing the voltage detected for the second battery to a voltage detected for the first battery and reducing the impedance in the discharge path responsive to a determination that the first battery and the second battery satisfy a predetermined relationship.

In another example method of any preceding method, the discharge path bypasses the adjustable resistance in the charge path.

In yet another example method of any preceding method, the first battery is chargeable along the charge path by a back-flow of charge from a second battery of the multiple batteries to enable battery charge-balancing.

In another example method of any preceding method, the battery parameter includes a current state of charge of the first battery.

An example device disclosed herein include multiple batteries with disparate charge characteristics. The batteries are connected in parallel and share a single charging node. The device further includes op-amp operating in a linear mode that applies an output voltage to a gate drive of a field-effect transistor (1-ET) to control impedance in a charge path between the single charging node and a first battery of the multiple batteries. The device additionally includes charge control circuitry that detects a battery parameter of at least one of the multiple batteries and controls a reference voltage supplied to the op-amp to charge the first battery at a charge rate selected based on the detected battery parameter.

In an example device of any preceding device, the charge control circuitry is configured to dynamically alter the charge rate for the first battery responsive to detection of a change in the battery parameter.

In still another example device of any preceding device, the device further includes discharge control circuitry that selectively discharges current from the first battery along a discharge path bypassing the FET responsive to detection of voltage drop in the single charging node of the multiple batteries below a predetermined threshold.

An example system disclosed herein includes a means for detecting a battery parameter for at least one of multiple batteries with disparate charge characteristics, where the batteries are connected in parallel and configured to share a single charging node. The system further includes a means for determining a charge rate for a first battery of the multiple batteries based on the detected battery parameters and a means for controlling an adjustable resistance in a charge path between the single charging node and the first battery to charge to the first battery at the determined charge rate.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A device comprising:
   two batteries with disparate charge characteristics connected in parallel and sharing a single charging node;
   an adjustable resistance in a charge path between the single charging node and a first battery of the two batteries, the adjustable resistance being adjustable between different finite values; and
   charge control circuitry that:
   determines a first charge rate for the first battery based on a detected battery parameter;
   adjusts the adjustable resistance to alter a flow of current to the first battery to begin charging the first battery at the first charge rate while a second battery of the two batteries is charged at a second charge rate different from the first charge rate; and
   alters total charge input at the single charging node based on a sum of the first charge rate and the second charge rate.

2. The device of claim 1, wherein the charge control circuitry is configured to dynamically alter the first charge rate for the first battery responsive to a detected change in the detected battery parameter.

3. The device of claim 1, wherein the adjustable resistance includes an operational amplifier (op-amp) that controls a transistor operating in a linear mode to control impedance in the charge path to charge the first battery at the first charge rate.

4. The device of claim 1, wherein the detected battery parameter includes a current state of charge of the first battery.

5. The device of claim 1, further comprising:
   discharge control circuitry that selectively discharges current from the first battery along a discharge path bypassing the adjustable resistance responsive to detection of a voltage drop of the single charging node below a predetermined threshold.

6. The device of claim 5, wherein the discharge control circuitry includes at least one of a comparator and an op-amp to compare voltage detected for the single charging node to voltage detected for the first battery.

7. The device of claim 1, wherein the first battery is chargeable along the charge path by either an external power supply coupled to the single charging node or by a back-flow of current from a second battery of the two batteries.

8. The device of claim 1, wherein the charge control circuitry alters the current flow input at the single charging node to equal the sum of the first charge rate and the second charge rate.

9. A method comprising:
   detecting a battery parameter for at least one of multiple batteries in parallel and sharing a single charging node in an electronic device, the multiple batteries having disparate charge characteristics;
   determining a first charge rate for a first battery of the multiple batteries based on the detected battery parameters;
   adjusting an adjustable resistance in a charge path between the single charging node and the first battery to alter a flow of current to the first battery to begin charging the first battery at the first charge rate while charging a second battery of the two batteries at a second charge rate different from the first charge rate, the adjustable resistance being adjustable between different finite values; and
   altering total charge input at the single charging node based on a sum of the first charge rate and the second charge rate.

10. The method of claim 9, further comprising:
    detecting a change in the battery parameter;
    determining a new charge rate for the first battery responsive to the detected change in the battery parameter; and
    controlling the adjustable resistance to provide a constant charge to the first battery at the new charge rate.

11. The method of claim 9, wherein controlling the adjustable resistance further comprises:
    setting a reference voltage based on the detected battery parameter; and
    increasing the adjustable resistance to limit current charging the first battery to the first charge rate responsive to a determination that a voltage along the charge path exceeds the reference voltage.

12. The method of claim 9, where the adjustable resistance includes an operational amplifier (op-amp) that operates a transistor in a linear mode to control impedance in the charge path to charge the first battery at the first charge rate.

13. The method of claim 9, further comprising:
    detecting a voltage for a second battery of the multiple batteries; and
    reducing impedance in a discharge path to enable a discharge current flow and support a system load with the first battery responsive to a determination that the detected voltage for the second battery satisfies a threshold.

14. The method of claim 13, further comprising:
    comparing the voltage detected for the second battery to a voltage detected for the first battery and reducing the impedance in the discharge path responsive to a determination that the first battery and the second battery satisfy a predetermined relationship.

15. The method of claim 13, wherein the discharge path bypasses the adjustable resistance in the charge path.

16. The method of claim 9, wherein the first battery is chargeable along the charge path by a back-flow of charge from a second battery of the multiple batteries to enable battery charge-balancing.

17. The method of claim 9, wherein the battery parameter includes a current state of charge of the first battery.

18. A device comprising:
    multiple batteries with disparate charge characteristics connected in parallel and sharing a single charging node;
    an operational amplifier (op-amp) operating in a linear mode that applies an output voltage to a gate drive of a field-effect transistor (FET) to control impedance in a charge path between the single charging node and a first battery of the multiple batteries; and
    charge control circuitry that:
    detects a battery parameter of at least one of the multiple batteries;
    adjusts a reference voltage supplied to the op-amp to adjust the impedance in the charge path between different finite values to begin charging the first battery at a first charge rate selected based on the detected battery parameter while charging a second battery of the multiple batteries at a second different charge rate; and
    alters total charge input at the single charging node based on a sum of the first charge rate and the second charge rate.

19. The device of claim 18, wherein the charge control circuitry is configured to dynamically alter the first charge rate for the first battery responsive to detection of a change in the battery parameter.

20. The device of claim 18, further comprising:
 discharge control circuitry that selectively discharges current from the first battery along a discharge path bypassing the FET responsive to detection of voltage drop in the single charging node of the multiple batteries below a predetermined threshold.

* * * * *